United States Patent Office 3,746,624
Patented July 17, 1973

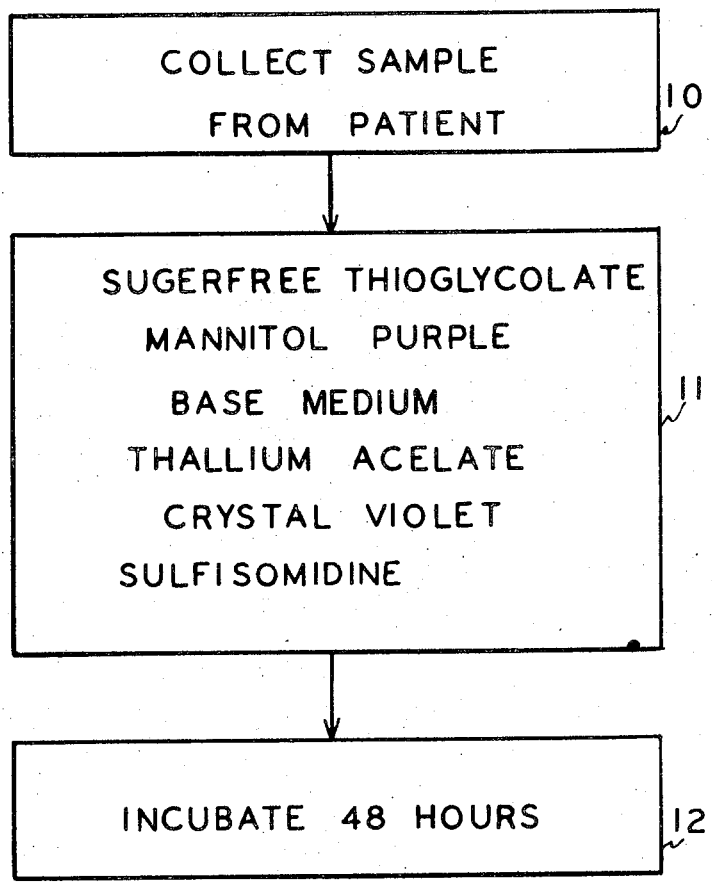

---

3,746,624
**48-HOUR TEST FOR *STREPTOCOCCUS MUTANS*
IN PLAQUE**
Kirk C. Hoerman, Lake Bluff, Irving L. Shklair, Waukegan, James E. Klima, Great Lakes, and Lloyd G. Simonson, Waukegan, Ill., assignors to the United States of America as represented by the Secretary of the Navy
Filed Apr. 21, 1972, Ser. No. 246,291
Int. Cl. C12k *1/10*
U.S. Cl. 195—100                                    7 Claims

ABSTRACT OF THE DISCLOSURE

The invention disclosed herein relates to a 48-hour test for determining the presence of *Streptococcus mutans* whose occurrence is highly correlated to dental caries The organisms' presence may be determined thru an inexpensive and rapid procedure including a test solution of mannitol in sugar-free thioglycolate medium, a purple broth base medium, thallium acetate, crystal violet and sulfisomidine.

---

The efforts of the dental profession and the research community has for a long time been directed towards the elimination of dental caries and many researchers believe that the correlation between the presence of *Streptococcus mutans* and dental caries is so signficant that a determination of the presence of *Streptococcus mutans* indicates dental caries presence and absence indicates a high potential for its non-concurrence.

An inexpensive rapid method of determining the presence of the *Streptococcus mutans* would indicate to a dentist an area to treat in a patient's mouth before the determination of the presence of dental caries would be indicated by visual or X-ray examination.

Sub-microscopic caries not normally observed by the human eye might well be determined and treated earlier, thus preserving the tooth.

It is therefore an objective of this invention to provide an improved method for testing for the presence of *Streptococcus mutans*.

It is still a further objective of this invention to provide an improved test for the presence to *Streptococcus mutans* employing a unique solution to test specimens from the patient's mouth that will indicate the presence, thru a color test, of the *Streptococcus mutans*.

It is yet a further objective of this invention to provide a method of determining the presence of *Streptococcus mutans* combining the steps of removing a specimen in the area immediately adjacent to the patient's tooth; placing the specimen in a liquid combining sugar-free thioglycolate, mannitol, thallium acetate, crystal violet and sulfisomidine, incubating for 48 hours and observing the color change after the 48-hour incubation period.

Other objects, advantages and novel features of the invention will becomes apparent from the following detailed description of the invention when considered in conjunction with the accompanying drawing wherein:

The first step 10 of the method is to remove a specimen or series of specimens from the patient's mouth, generally this may be done by the insertion of dental floss between the teeth and remove the material in the mouth adjacent to the tooth with the floss.

The next step 11 in the process is to drop that portion of the floss with the specimen on it into the test solution.

The solution generally consists of a solution of 1% mannitol in sugar-free thioglycolate medium with a purple broth base medium. In addition, there is added to the solution thallium acetate, crystal violet and sulfisomidine. In one successful embodiment of the invention the following portions were used; to 100 milliliters of water add 2.4 grams of thioglycolate sugar-free medium, 1.6 grams of purple broth base medium, 1.0 gram of mannitol 0.033 gram of thallium acetate 0.001 gram of crystal violet, and 0.1 gram of sulfisomidine.

After the sample has been immersed in the solution, step 12 is to then incubate for a period of approximately 48 hours at 37° centigrade.

At the termination of the 48-hour period, a color of yellow indicates the presence of the *Streptococcus mutans*.

In one successful test, 110 samples of plaque were taken on floss from a clinically normal (no restorations or obvious caries) sites between the contact points of the upper right first molar and second bicuspid. The floss holding the plaque was cut and dropped in 2 ml. of medium and incubated for 48 hours at 37° centigrade. A change of color from purple to yellow after 48 hours indicated acid production because of *Streptococcus mutans*.

There were 50 positive tests in which the presence of *Streptococcus mutans* was verified morphologically and biochemically, in 33 instances of negative tests, *Streptococcus mutans* was also absent. The test was valid 75% of the time. The test was falsely positive in 14 instances and falsely negative in 13 cases. The test was deemed useful for following clinically, specific therapy against *Streptococcus mutans* in plaque on tooth surfaces.

Obviously, many modifications and variations of the present invention are possible in the light of the above teachings. It is therefore to be understood that within the scope of the appended claims the invention may be practiced otherwise than as specifically described.

We claim:
1. An improved method of determining the presence of *Streptococcus mutans* in the mouth of the dental patient comprising the follow steps:
   (a) removing a sample of the material adjacent to the patient's tooth;
   (b) placing the sample in a test solution consisting of mannitol, sugar-free thioglycolate medium with a purple broth base medium, thallium acetate, crystal violet and sulfisomidine;
   (c) incubate the sample in the solution at a temperature of about 37° C. for approximately 48 hours; and
   (d) determine the color of the sample at the termination of the 48-hour period; a yellow color in said solution indicates the presence of *Streptococcus mutans*.
2. The method of claim 1 wherein said solution has a 1% mannitol solution in sugar-free thioglycolate medium and purple broth base medium.
3. The method of claim 2 wherein to said mannitol in sugar-free thioglycolate medium and purple broth base medium is added thallium acetate at a concentration of 0.033 gram per 100 ml. of water.
4. The method of claim 3 wherein said solution of claim 3 is added the crystal violet in a portion of 0.001 gram to 100 ml. of water.
5. The method of class 4 wherein said solution of claim 4 is added 0.1 gram of sulfisomidine per 100 ml. of water.

6. An improved testing solution for *Streptococcus mutans* comprising a solution of a 1% of mannitol in sugar-free thioglycolate medium with a purple broth base medium, thallium acetate, crystal violet and sulfisomidine.

7. The solution of claim 6 wherein the test solution consists of a 1% solution of mannitol in sugar-free thioglycolate medium purple base medium, 0.033 grams of thallium acetate, 0.001 gram of crystal violet and 0.1 gram of sulfisomidine per 100 ml. of water.

References Cited

UNITED STATES PATENTS

| 3,332,743 | 7/1967 | Green | 195—103.5 R |
| 3,691,018 | 9/1972 | McNamara et al. | 195—103.5 R |

A. LOUIS MONACELL, Primary Examiner

R. J. WARDEN, Assistant Examiner

U.S. Cl. X.R.

195—103.5 R